(12) United States Patent
Hendren et al.

(10) Patent No.: US 9,172,758 B1
(45) Date of Patent: *Oct. 27, 2015

(54) AGENT-ASSISTED AND DIRECTED WEB-CHANNEL CUSTOMER CARE APPARATUS, METHOD, AND COMPUTER PROGRAM

(71) Applicant: West Corporation, Omaha, NE (US)

(72) Inventors: Chad David Hendren, Omaha, NE (US); Michelle Mason Winston, Omaha, NE (US); Kevin Todd Welch, Bennington, NE (US); Jerry Ehrenberg, Council Bluffs, IA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,527

(22) Filed: Mar. 2, 2015

Related U.S. Application Data

(63) Continuation of application No. 13/011,518, filed on Jan. 21, 2011, now Pat. No. 8,972,507.

(51) Int. Cl.
*H04L 29/08* (2006.01)
*H04L 12/58* (2006.01)
*G06F 17/30* (2006.01)

(52) U.S. Cl.
CPC ........ *H04L 67/141* (2013.01); *G06F 17/30386* (2013.01); *H04L 51/04* (2013.01)

(58) Field of Classification Search
None
See application file for complete search history.

(56) References Cited

U.S. PATENT DOCUMENTS

| | | | |
|---|---|---|---|
| 7,962,644 B1 * | 6/2011 | Ezerzer et al. | 709/238 |
| 8,332,473 B1 * | 12/2012 | Fouts et al. | 709/206 |
| 8,583,743 B1 * | 11/2013 | Gailloux et al. | 709/206 |
| 9,043,474 B2 * | 5/2015 | Schleifer et al. | 709/227 |
| 2002/0107910 A1 * | 8/2002 | Zhao | 709/203 |
| 2004/0098625 A1 * | 5/2004 | Lagadec et al. | 713/201 |
| 2004/0165603 A1 * | 8/2004 | D'Angelo et al. | 370/401 |
| 2005/0086255 A1 * | 4/2005 | Schran et al. | 707/102 |
| 2006/0116138 A1 * | 6/2006 | Simsek et al. | 455/466 |
| 2009/0149158 A1 * | 6/2009 | Goldfarb et al. | 455/414.1 |
| 2010/0306083 A1 * | 12/2010 | Oren | 705/27 |
| 2011/0179180 A1 | 7/2011 | Schleifer et al. | |

* cited by examiner

*Primary Examiner* — Anh-Vu Ly
*Assistant Examiner* — Hashim Bhatti

(57) ABSTRACT

An agent-assisted and directed web-channel customer care apparatus, method, and computer program is provided to receive, from a first device, an inbound message via an inbound messaging channel and create a web session utilizing a web session server. Session identification is received from the web session server and a unique identifier is transmitted to the first device in order for a second device to connect to an agent device via a web session. Communications is simultaneously maintained with the first and second device via the inbound messaging channel and the web session.

20 Claims, 7 Drawing Sheets

AGENT-ASSISTED AND DIRECTED WEB-CHANNEL CUSTOMER CARE APPARATUS, METHOD, AND COMPUTER PROGRAM

CROSS-REFERENCE TO RELATED APPLICATIONS

This application is a continuation from U.S. patent application Ser. No. 13/011,518, filed Jan. 21, 2011, and entitled "AGENT-ASSISTED AND DIRECTED WEB-CHANNEL CUSTOMER CARE APPARATUS, METHOD, AND COMPUTER PROGRAM", which is incorporated by reference herein in its entirety.

FIELD

The present invention relates to a multimodal application and, more particularly, to a multimodal application that allows an agent to communicate with and direct a customer on a web session.

BACKGROUND

Generally, when a customer requests technical support or assistance, the customer dials a telephone number, communicates through email, or through a chat messaging service. The customer goes through a series of steps in order to speak with or message an agent. Once the customer reaches the agent, the agent and customer communicate through a communication channel, which the customer used to contact the agent. However, when communicating with the agent utilizing such a communication channel, the customer may not receive adequate support because the agent assisting the customer is utilizing a single channel of communication.

SUMMARY

Certain embodiments of the present invention may provide solutions to the problems and needs in the art that have not yet been fully identified, appreciated, or solved by current agent-assisted applications. One or more embodiments described herein utilize an agent assisted application to allow an agent to assist the customer by simultaneously maintaining at least two channels of communication, i.e., an inbound channel and a web session. Stated another way, one or more embodiments described herein provide a multimodal application that allows inbound access from a number of channels, and enable an easily-accessible web channel for agents to deliver multimedia content to customers requiring assistance.

In accordance with an embodiment of the present invention, a computer-implemented method is provided. The method includes receiving, from a first device, an inbound message via an inbound messaging channel. The method includes creating a web session utilizing a web session server and receiving session identification from the web session server. The method also includes transmitting a unique identifier to the first device in order for a second device to connect to an agent device via a web session. The method further includes simultaneously maintaining communications with the first and second device via the inbound messaging channel and the web session.

In yet another embodiment of the present invention, a computer program is provided. The computer program is embodied on a non-transitory computer readable medium, the computer program causing a processor to receive, from a first device, an inbound message via an inbound messaging channel. The computer program also causes the processor to create a web session utilizing a web session server, receive a session identification from the web session server, and transmit a unique identifier to the first device in order for a second device to connect to an agent device via a web session. The computer program further causes the processor to simultaneously maintain communications with the first and second device via the inbound messaging channel and the web session.

In yet another embodiment of the present invention, an apparatus is provided. The apparatus includes a processor and memory storing instructions thereon. The processor is configured to receive, from a first device, an inbound message via an inbound messaging channel and create a web session utilizing a web session server. The processor is configured to receive session identification from the web session server and transmit a unique identifier to the first device in order for a second device to connect to an agent device via a web session. The processor is also configured to simultaneously maintain communications with the first and second device via the inbound messaging channel and the web session.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Figure 1:
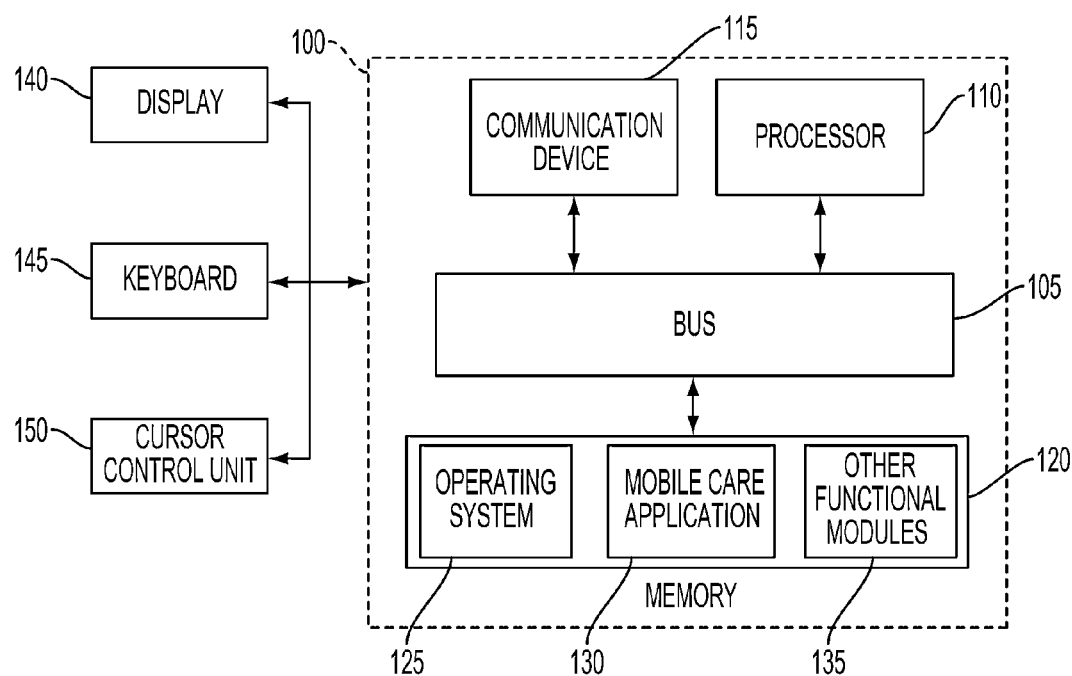
FIG. 1 illustrates a block diagram of a multimodal application system with agent control that can be implement in one or more embodiments of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein relate to an apparatus, method, and computer program for allowing contact center agents to easily direct customers to a web session through a dynamic session-identification and/or uniform resource link (URL) schema. The schema is unique to the agent/customer session for the purpose of enabling the agent to deliver or collect information relevant to the customer's needs and status within the contact relationship management system.

One or more embodiments described herein also allow customers to contact agents via voice, chat, short message service (SMS), email, social media websites (i.e., Facebook®, Twitter®, etc.), Smartphone, etc., and provide the customer with a URL to access via a standard web browser. For instance, when the customer enters the URL in the web browser, the web session will be directed by the agent for the purpose of sending specific HTML-based screens to the customer. The agents can send screens that reflect product documentation, frequently asked questions (FAQ), warranty information, video contact, or any other information that enables the agent to service the customer's needs. The agents can also send screens that direct input from customers, such as new billing information and contact updates (i.e., address, phone, etc.)

One or more embodiments described herein also allow the apparatus, method and computer program to couple (or simultaneously maintain) an inbound channel with a dynamic, two-way web channel as an added channel versus releasing the inbound session and having the customer work through the web channel exclusively. For example, during a voice call, a determination is made as to what category the customer needs. Based on the determination, the voice call is routed to the agent with the required skills. The agent determines whether the web channel is valuable and, if so, generates a dynamic web session URL in order to engage the customer. The customer then enters the URL in the web browser and the agent interactively drives audio, via an inbound voice channel, and drives dynamic content through a web session. It should be appreciated that the two-way web channel can allow customers as well as agents to update information.

Furthermore, during a chat session, if the agent determines that a web channel is valuable, then a dynamic web session URL is generated in order to engage the customer. The customer can then start the web session by launching the hyperlink sent by the agent (with the URL) and the agent can interactively drive the chat session, via an inbound chat channel, and drive dynamic contact through the web session. SMS, Smartphone, and social media platforms can also be used in a similar manner. For example, using an inbound contact channel, the multimodal application allows the agent to conveniently direct customers to a web channel that is specific to their real-time needs with direct agent guidance.

FIG. 1 illustrates a block diagram of a multimodal application system 100 with agent control that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available medium that can be accessed by processor 110. The computer readable medium may include both volatile and nonvolatile media, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). For example, display 140 may display customer information to the agent. A keyboard 145 and a cursor control unit 150, such as a computer mouse, may also be coupled to bus 105 to enable the agent to interface with system 100.

According to one embodiment, memory 120 may store software modules that may provide functionality when executed by processor 110. The modules can include an operating system 125 and a multimodal application 130, as well as other functional modules 135. Operating system 125 may provide operating system functionality for system 100. Because system 100 may be part of a larger system, system 100 may include one or more additional functional modules 135 to include the additional functionally.

Figure 2:
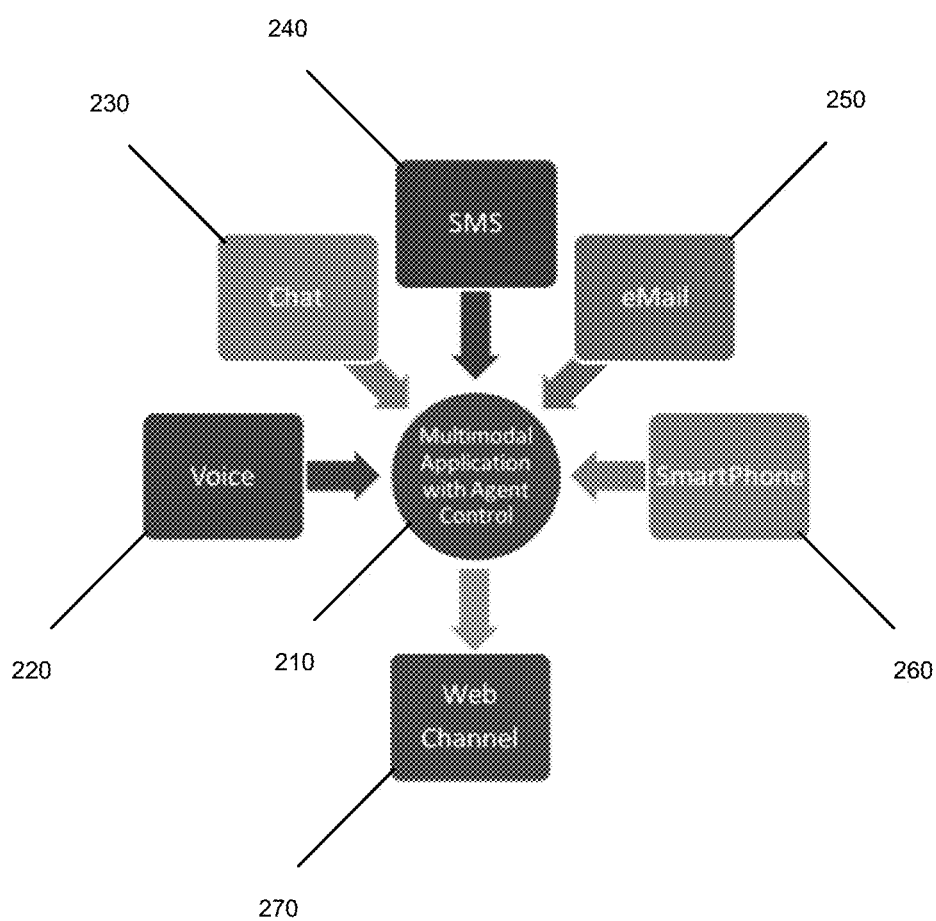
FIG. 2 illustrates a multimodal application system with agent control, in accordance with one or more embodiments of the present invention.

FIG. 2 illustrates a multimodal application system 200, in accordance with one or more embodiments of the present invention. The system 200 includes a multimodal application 210 with agent control and a plurality of inbound channels, as well as at least one web channel 270. The plurality of inbound channels can include a voice channel 220 to receive voice data, a chat channel 230 to receive chat messaging data, an SMS channel 240 to receive SMS data, an email channel 250 to receive electronic mail, and a Smartphone channel 260. Based on the inbound channel used by the customer, the multimodal application is configured to direct the customer to the appropriate web channel 270. In other words, the multimodal application receives a message from a customer's first device and, based on the message, the application connects the agent with a customer's second device through the appropriate web channel. The first device and second device can be a telephone, mobile phone, computer, or any other device that would be appreciated by a person of ordinary skill in the art.

Figure 3:
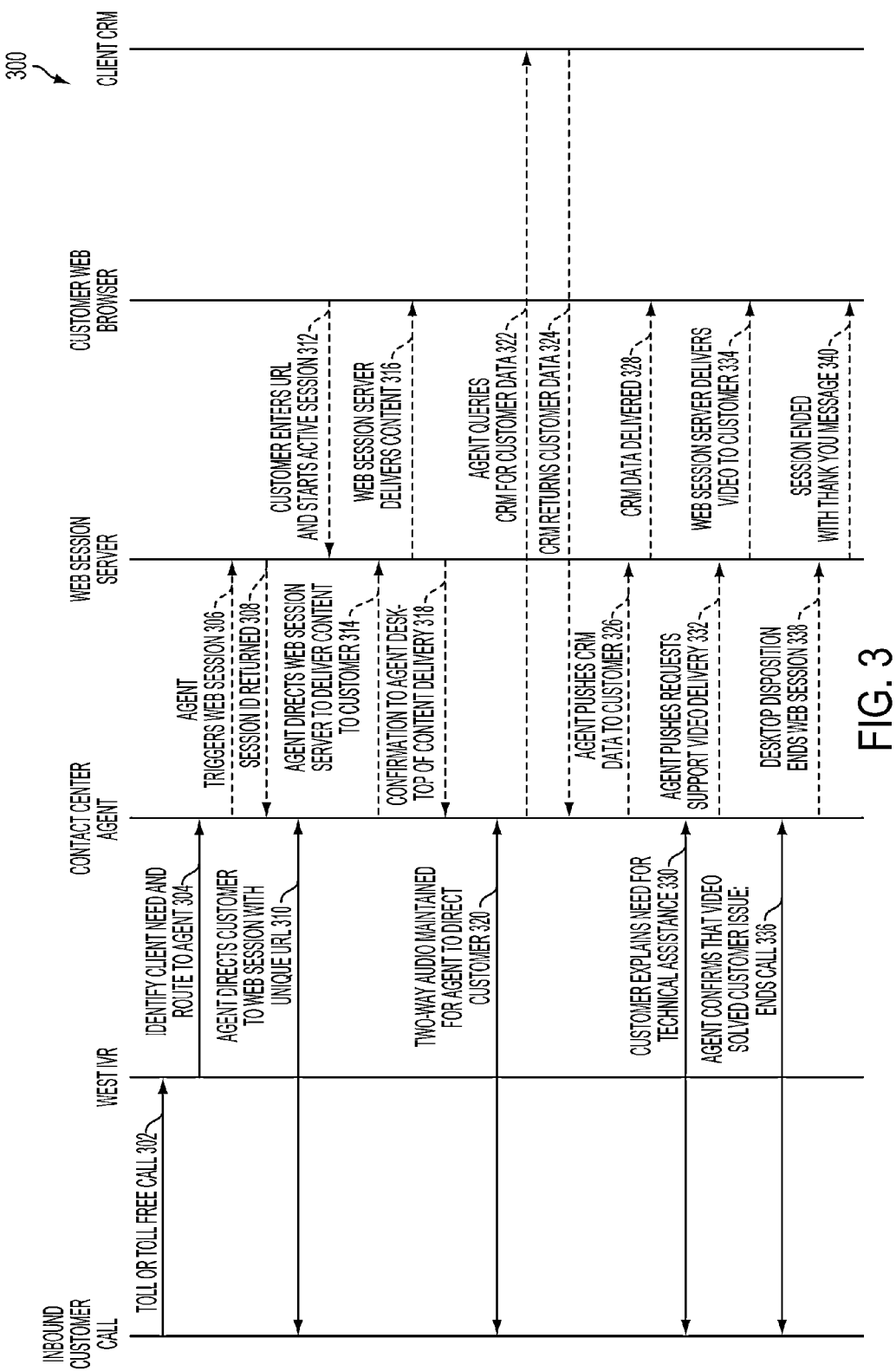
FIG. 3 is a flow diagram for establishing a web channel when receiving a voice call, in accordance with one or more embodiments of the present invention.

FIG. 3 is a flow diagram 300 for establishing a web channel when receiving a voice call, in accordance with one or more embodiments of the present invention. At 302, a toll or toll free call (or an inbound message or voice data) is received as a West interactive voice response (IVR) from a customer. At 304, the client's (or customer's) need is identified by the West IVR and the call is routed to an agent at a contact center. For example, the call is received at the agent's computer through an inbound messaging channel. In this embodiment, the inbound messaging channel is a voice data channel. However, as discussed below, the inbound messaging channel can also be a chat messaging data channel, an SMS data channel, an email data channel, or a Smartphone data channel. The agent can then trigger or create a web session at 306 and, at 308, receive session identification (ID) from a web session server.

At 310, the agent directs the customer to the web session with a unique URL and, at 312, the customer enters the URL and starts an active session with the agent. At 314, the agent directs the web session server to deliver content data to the customer. The web session server then transmits at 316 the content data to the customer's web browser. Upon transmission and delivery of the content data to the customer's web browser, the web session server at 318 sends a confirmation of content data delivery to the agent's desktop.

At 320, two-way audio is simultaneously maintained for the agent to direct the customer. In other words, the agent is simultaneously connected to the customer's first device (e.g., a phone) and second device (e.g., a computer). At 322, the agent queries the client's customer resource management (CRM) system for customer data (or customer information), and receives the customer data from the CRM system at 324. At 326, the agent pushes the customer data to the customer via the web session server and, at 328, the web session server delivers the customer data to the customer's web browser.

At 330, via the inbound call, the customer can explain the need for technical assistance to the agent. At 332, the agent pushes a request for video delivery support via the web session server. At 334, the web session server delivers the video to the customer's web browser.

At 336, the agent confirms that the video solved the customer's issues and ends the call. The agent, at 338, then sends a desktop disposition to the web session server to end the web session. The web session server, at 340, ends the session with a thank you message.

Figure 4:
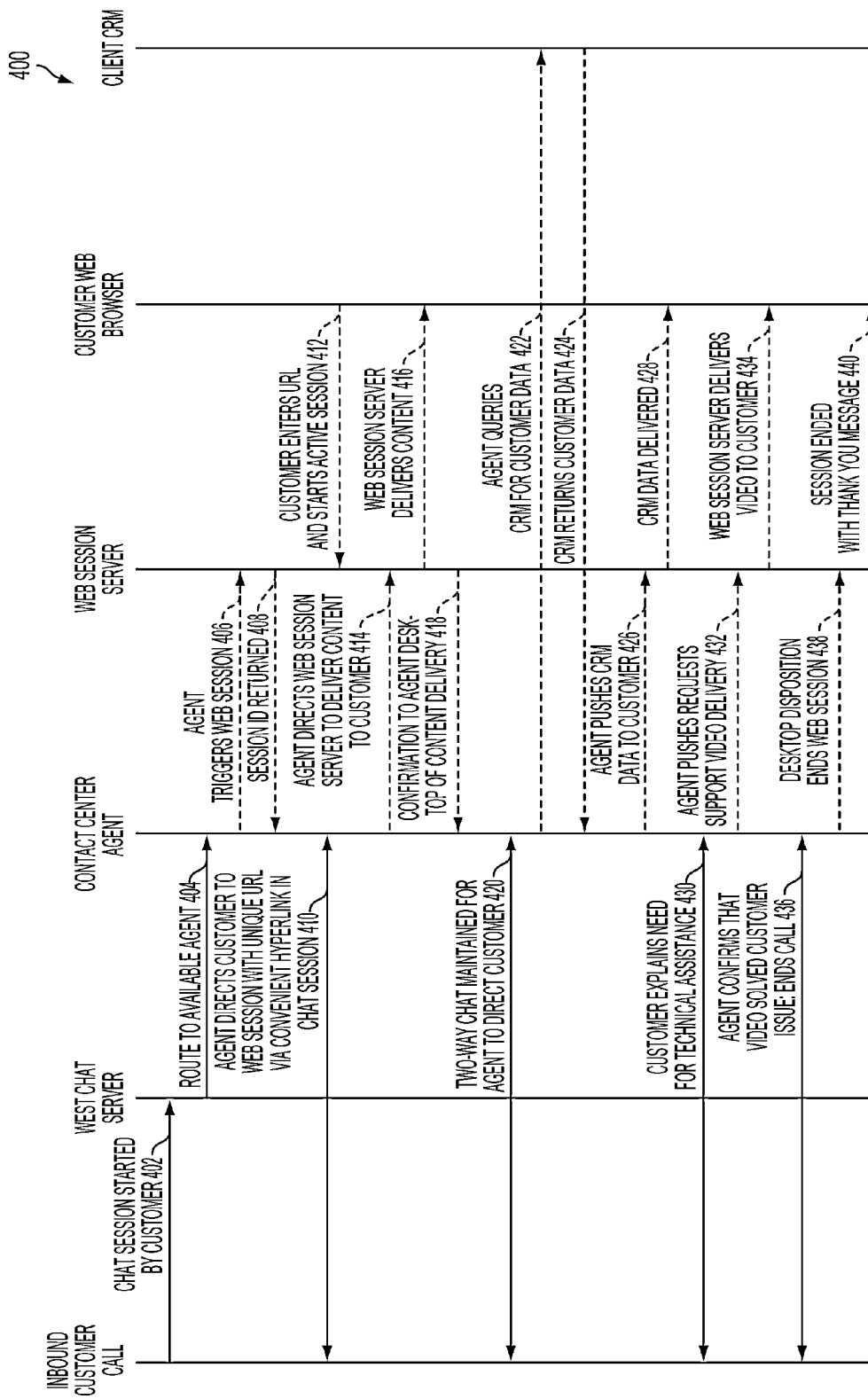
FIG. 4 illustrates a flow diagram for establishing a web channel when receiving a call via a chat session, in accordance with one or more embodiments of the present invention.

FIG. 4 illustrates a flow diagram 400 for establishing a web channel when receiving a call via a chat session, in accordance with one or more embodiments of the present invention.

At 402, an inbound customer call or a chat session created by a customer is received at a West chat server. The West chat server at 404 routes the chat session to an available agent. At 406, the agent triggers a web session and a session ID is returned by the web session server at 408. At 410, in the chat session, the agent directs the customer to the web session by sending the customer a unique URL or a hyperlink. At 412, the customer enters the URL in the customer's web browser and starts the session. At 414, the agent directs the web session server to deliver content to the customer and, at 416, the web session server delivers the content to the customer's web browser. Upon delivery of the content, the web session server delivers at 418 a confirmation to the agent's desktop.

At 420, the two-way chat session is maintained for the agent to direct the customer. At 422, the agent queries the client's CRM system for customer data, and receives the customer data at 424 from the CRM system. At 426, the agent pushes the customer data to the web session server and, at 428, the web session server delivers the customer data to the customer's web browser.

At 430, the customer explains the need for technical support or assistance via the chat session and, at 432, based on the requested assistance, the agent pushes the request support video to the web session server. The web session server at 434 delivers the video to the customer's web browser. The agent at 436 confirms that the video solved the customer's issues and ends the call. The agent at 438 then sends a desktop disposition to end the web session to the web session server and, at 440, the web session server ends the session with the customer's web browser and sends a thank you message.

Figure 5:
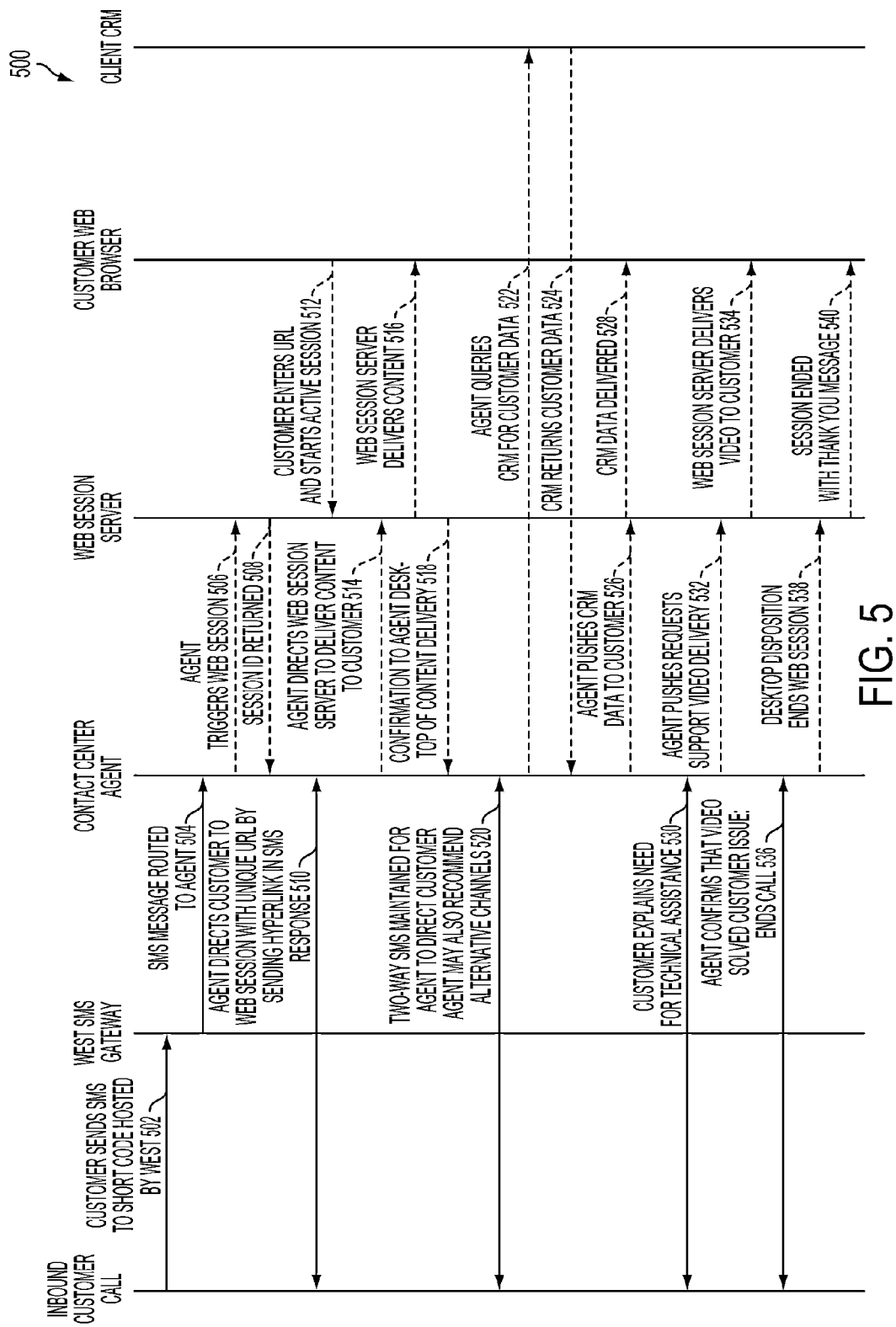
FIG. 5 illustrates a flow diagram for establishing a web channel when receiving a call via SMS, in accordance with one or more embodiments of the present invention.

FIG. 5 illustrates a flow diagram 500 for establishing a web channel when receiving a call via SMS, in accordance with one or more embodiments of the present invention.

At 502, an inbound customer call or an SMS message is received at a West SMS gateway. The West SMS gateway at 504 routes the chat session to an available agent. At 506, the agent triggers a web session and a session ID is returned by the web session server at 508. At 510, the agent directs the customer to the web session with a unique URL by sending a hyperlink in an SMS response. At 512, the customer enters the URL in the customer's web browser and starts the session. At 514, the agent directs the web session server to deliver content to the customer and, at 516, the web session server delivers the content to the customer's web browser. Upon delivery of the content, the web session server delivers at 518 a confirmation to the agent's desktop.

At 520, the two-way SMS session is maintained for the agent to direct the customer. It should be appreciated that the agent can also recommend alternative channels of communication. At 522, the agent queries the client's CRM system for customer data, and receives the customer data at 524 from the CRM system. At 526, the agent pushes the customer data to the web session server and, at 528, the web session server delivers the customer data to the customer's web browser.

At 530, the customer explains the need for technical support or assistance via SMS. And, at 532, based on the requested assistance, the agent pushes the request support video to the web session server. The web session server at 534 delivers the video to the customer's web browser. The agent at 536 confirms that the video solved the customer's issues and ends the call. The agent at 538 then sends a desktop disposition to end the web session to the web session server and, at 540, the web session server ends the session with the customer's web browser and sends a thank you message.

Figure 6:
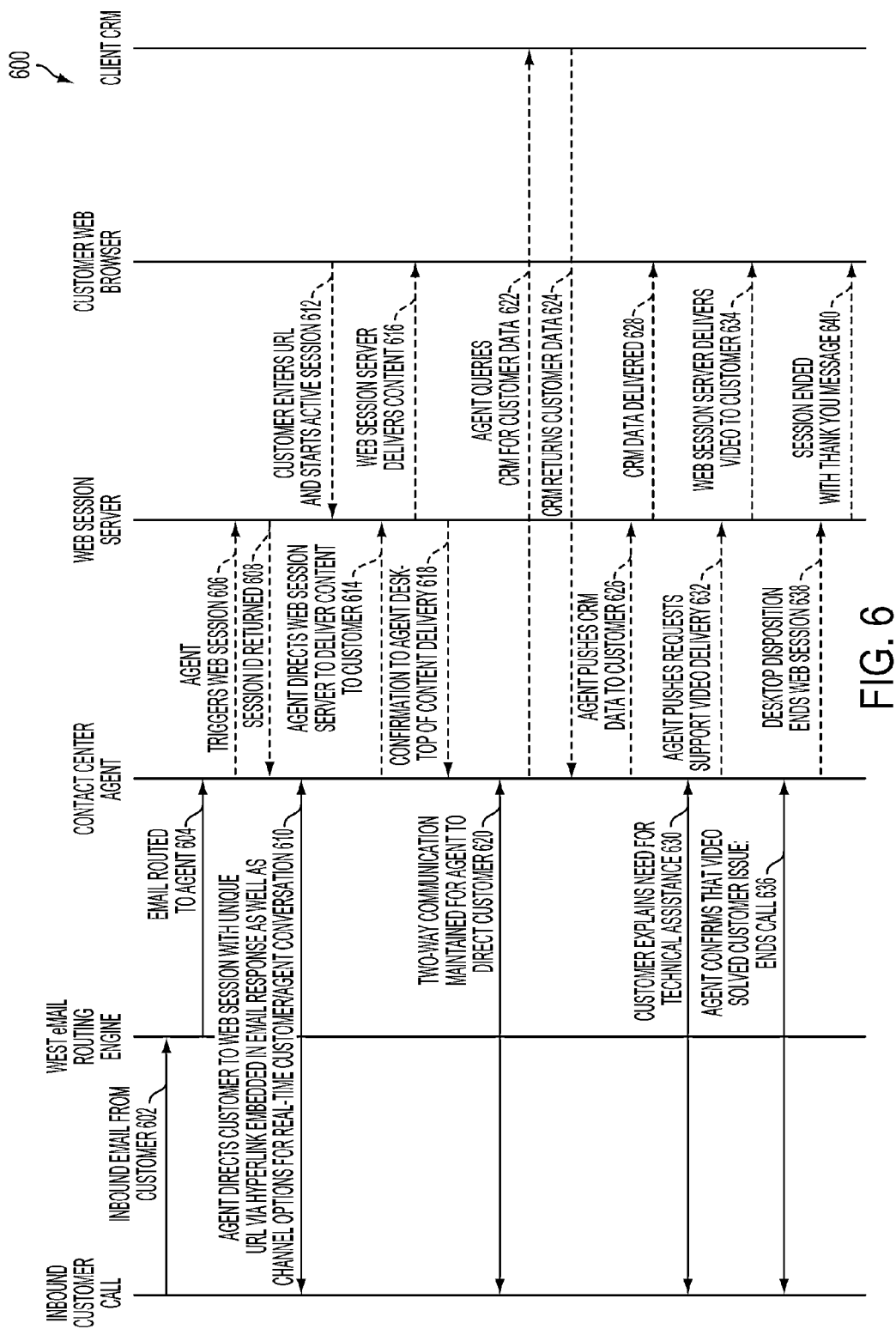
FIG. 6 illustrates a flow diagram for establishing a web channel when receiving a call via an email, in accordance with one or more embodiments of the present invention.

FIG. 6 illustrates a flow diagram 600 for establishing a web channel when receiving a call via an email, in accordance with one or more embodiments of the present invention.

At 602, an inbound customer email is received at a West email routing engine. The West email routing engine at 604 routes the email to an available agent. At 606, the agent triggers a web session and a session ID is returned by the web session server at 608. At 610, in an email, the agent directs the customer to a web session with a unique URL via a hyperlink embedded within the email response as well as channel options for real-time customer/agent conversation. At 612, the customer enters the URL in the customer's web browser and starts the session. At 614, the agent directs the web session server to deliver content to the customer and, at 616, the web session server delivers the content to the customer's web browser. Upon delivery of the content, the web session server delivers at 618 a confirmation to the agent's desktop.

At 620, the two-way email communication is maintained for the agent to direct the customer. At 622, the agent queries the client's CRM system for customer data, and receives the customer data at 624 from the CRM system. At 626, the agent pushes the customer data to the web session server and, at 628, the web session server delivers the customer data to the customer's web browser.

At 630, the customer explains the need for technical support or assistance via email communication. And, at 632, based on the requested assistance, the agent pushes the request support video to the web session server. The web session server at 634 delivers the video to the customer's web browser. The agent at 636 confirms that the video solved the customer's issues and ends the call. The agent at 638 then sends a desktop disposition to end the web session to the web session server and, at 640, the web session server ends the session with the customer's web browser and sends a thank you message.

Figure 7:
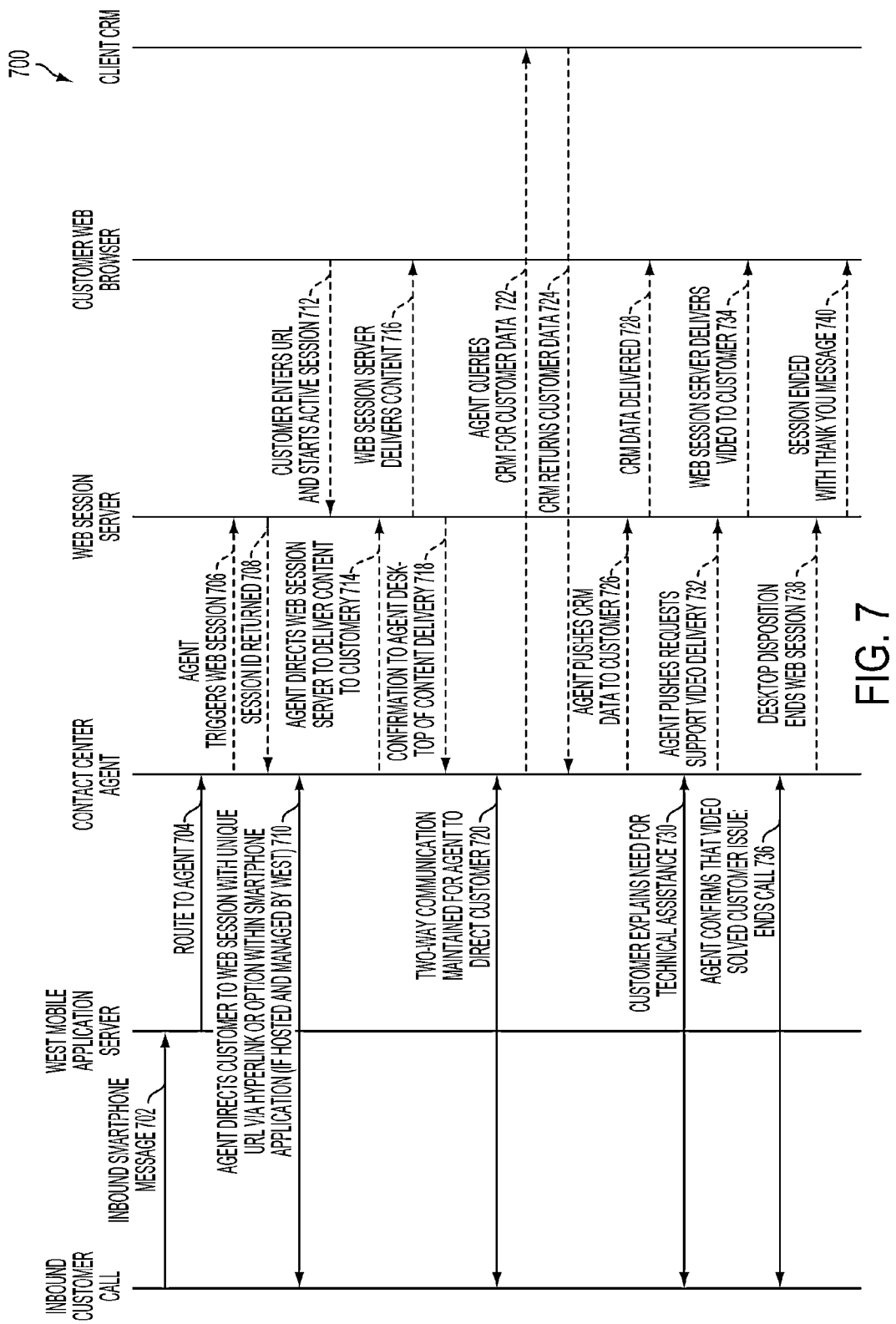
FIG. 7 illustrates a flow diagram for establishing a web channel when receiving a call via a Smartphone message, in accordance with one or more embodiments of the present invention.

FIG. 7 illustrates a flow diagram 700 for establishing a web channel when receiving a call via a Smartphone message, in accordance with one or more embodiments of the present invention.

At 702, an inbound Smartphone message created by a customer is received at a West mobile application server. The West mobile application server at 704 routes the Smartphone message to an available agent. At 706, the agent triggers a web session and a session ID is returned by the web session server at 708. At 710, in the Smartphone message, the agent directs the customer to the web session with a unique URL via a hyperlink or, if hosted and managed by West, an option within the Smartphone Application. At 712, the customer enters the URL in the customer's web browser and starts the session. At 714, the agent directs the web session server to deliver content to the customer and, at 716, the web session server delivers the content to the customer's web browser. Upon delivery of the content, the web session server delivers at 718 a confirmation to the agent's desktop.

At 720, the two-way Smartphone message communication is maintained for the agent to direct the customer. At 722, the agent queries the client's CRM system for customer data, and receives the customer data at 724 from the CRM system. At 726, the agent pushes the customer data to the web session server and, at 728, the web session server delivers the customer data to the customer's web browser.

At 730, the customer explains the need for technical support or assistance via the Smartphone message. And, at 732, based on the requested assistance, the agent pushes the request support video to the web session server. The web session server at 734 delivers the video to the customer's web browser. The agent at 736 confirms that the video solved the customer's issues and ends the call. The agent at 738 then sends a desktop disposition to end the web session to the web session server and, at 740, the web session server ends the session with the customer's web browser and sends a thank you message.

The method steps performed in FIGS. 2 to 7 may be performed, in part, by a computer program product, encoding instructions for a nonlinear adaptive processor to cause at least the methods described in FIGS. 2 to 7 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIGS. 2 to 7, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving, from a first device, an inbound message via an inbound messaging channel;
determining, by a multimodal application, a type of the inbound messaging channel;
creating a web session utilizing a web session server based on the type of the inbound messaging channel;
transmitting a unique identifier to the first device in order for a second device to connect to an agent device via the web session;
directing a user, by the multimodal application, to an appropriate web channel based on the type of the inbound messaging channel; and
simultaneously maintaining communications with the first and second device via the inbound messaging channel and the web session.

2. The method of claim 1, wherein the inbound messaging channel comprises a voice data channel, a chat messaging data channel, a short message service data channel, an electronic mail data channel, or a Smartphone data channel.

3. The method of claim 1, wherein the inbound message comprises voice data, chat messaging data, short message service data, electronic mail data, or Smartphone data.

4. The method of claim 1, further comprising:
delivering content data to the second device via the web session server; and
receiving delivery confirmation data from the web session server, when the content data is received at the second device.

5. The method of claim 1, further comprising:
querying a database for customer information and receiving the customer information from the database; and
transmitting the customer information to the second device via the web session server.

6. The method of claim 1, further comprising:
receiving another inbound message from the first device, via the inbound messaging channel; and
transmitting support data to the second device based on the other inbound message,
wherein the other inbound message comprises a request for technical assistance.

7. The method of claim 1, further comprising instructing the web session server to end the web session with the second device when receiving a confirmation message data from the second device that technical assistance is not required.

8. A non-transitory computer readable medium comprising a computer executable program configured to cause a processor to:
receive, from a first device, an inbound message via an inbound messaging channel;
determine a type of the inbound messaging channel;
create a web session utilizing a web session server based on the type of the inbound messaging channel;
transmit a unique identifier to the first device in order for a second device to connect to an agent device via the web session;
direct a user to an appropriate web channel based on the type of the inbound messaging channel; and
simultaneously maintain communications with the first and second device via the inbound messaging channel and the web session.

9. The non-transitory computer readable medium of claim 8, wherein the inbound messaging channel comprises a voice data channel, a chat messaging data channel, a short message service data channel, an electronic mail data channel, or a Smartphone data channel.

10. The non-transitory computer readable medium of claim 8, wherein the inbound message comprises voice data, chat messaging data, short message service data, electronic mail data, or Smartphone data.

11. The non-transitory computer readable medium of claim 8, wherein the computer executable program is further configured to cause the processor to:
    deliver content data to the second device via the web session server; and
    receive delivery confirmation data from the web session server when the content data is received at the second device.

12. The non-transitory computer readable medium of claim 8, wherein the computer executable program is further configured to cause the processor to:
    query a database for customer information and receiving the customer information from the database; and
    transmit the customer information to the second device via the web session server.

13. The non-transitory computer readable medium of claim 8, wherein the computer executable program is further configured to cause the processor to:
    receive another inbound message from the first device, via the inbound messaging channel; and
    transmit support data to the second device based on the other inbound message,
    wherein the other inbound message comprises a request for technical assistance.

14. The non-transitory computer readable medium of claim 8, wherein the computer executable program is further configured to causes the processor to instruct the web session server to end the web session with the second device when receiving a confirmation message data from the second device that technical assistance is not required.

15. An apparatus, comprising:
    a processor; and
    memory comprising instructions,
    wherein the processor is configured to:
        receive, from a first device, an inbound message via an inbound messaging channel,
        determine a type of the inbound messaging channel,
        create a web session utilizing a web session server based on the type of the inbound messaging channel,
        transmit a unique identifier to the first device in order for a second device to connect to an agent device via the web session,
        direct a user to an appropriate web channel based on the type of the inbound messaging channel, and
        simultaneously maintain communications with the first and second device via the inbound messaging channel and the web session.

16. The apparatus of claim 15, wherein
    the inbound messaging channel comprises a voice data channel, a chat messaging data channel, a short message service data channel, an electronic mail data channel, or a Smartphone data channel, and
    the inbound message comprises voice data, chat messaging data, short message service data, electronic mail data, or Smartphone data.

17. The apparatus of claim 15, wherein the processor is further configured to:
    deliver content data to the second device via the web session server; and
    receive delivery confirmation data from the web session server when the content data is received at the second device.

18. The apparatus of claim 15, wherein the processor is further configured to:
    query a database for customer information and receiving the customer information from the database; and
    transmit the customer information to the second device via the web session server.

19. The apparatus of claim 15, wherein the processor is further configured to:
    receive another inbound message from the first device, via the inbound messaging channel; and
    transmit support data to the second device based on the other inbound message,
    wherein the other inbound message comprises a request for technical assistance.

20. The apparatus of claim 15, wherein the processor is further configured to instruct the web session server to end the web session with the second device when receiving a confirmation message data from the second device that technical assistance is not required.

* * * * *